United States Patent [19]

Zimmermann

[11] Patent Number: 4,531,383
[45] Date of Patent: Jul. 30, 1985

[54] COOLING THE LIQUID IN AN INSULATING CONTAINER

[75] Inventor: Anso Zimmermann, Bad Hersfeld, Fed. Rep. of Germany

[73] Assignee: Rotpunkt Dr. Anso Zimmermann, Niederaula, Fed. Rep. of Germany

[21] Appl. No.: 563,162

[22] Filed: Dec. 19, 1983

[30] Foreign Application Priority Data

Sep. 5, 1983 [DE] Fed. Rep. of Germany ....... 3331954

[51] Int. Cl.³ ............................................... F25D 3/08
[52] U.S. Cl. ......................................... 62/457; 62/529
[58] Field of Search ................... 62/293, 371, 529, 530, 62/430, 457

[56] References Cited

U.S. PATENT DOCUMENTS

| 1,199,593 | 9/1916 | Muller | 62/457 X |
| 1,728,572 | 9/1929 | Pearson | 62/529 X |
| 1,731,539 | 10/1929 | Pearson | 62/371 |
| 1,954,369 | 4/1934 | Solomon | 62/457 X |
| 2,160,165 | 5/1939 | Patterson | 62/457 |
| 2,468,661 | 4/1949 | Gladstone | 62/457 X |
| 2,734,358 | 2/1956 | Himmelfarb | 62/457 X |
| 3,059,452 | 10/1962 | Griffin | 62/457 |

Primary Examiner—Lloyd L. King
Attorney, Agent, or Firm—Lewis H. Eslinger

[57] ABSTRACT

A screw lid for an insulating container, which includes a sealing cup and a cover surrounding it, can be screwed onto a cap fixed to the cover. The screw lid is made of plastic and traps a plastic sealing ring against a sealing face on the container to close the container and form a seal. The lid includes a hollow cylindrical cooling body that, when the lid is in place, projects into the sealing cup through the opening sufficiently far to be immersed in the liquid in the sealing cup. The cooling body has a maximum cross-sectional dimension such that it can be accommodated by the cross-sectional dimension of the sealing-cup opening without contacting the sealing-cup opening. By filling the cooling body with a suitable coolant and refrigerating the cooling body prior to attaching the lid to the container, the liquid in the sealing cup will be brought to a low temperature and maintained at a low temperature longer.

3 Claims, 2 Drawing Figures

COOLING THE LIQUID IN AN INSULATING CONTAINER

BACKGROUND OF THE INVENTION

1. Field of the Invention

The present invention relates to an insulating container and, more particularly, to a device and a method for reducing the temperature of a liquid in the container.

2. Description of the Prior Art

Insulating containers are used to keep cool drinks or other fluids cold for long periods of time. However, such drinks must be cold before they are put into the container. Furthermore, no matter how well the container is made, some heat is always transferred to the drink in the container over a period of time and the drink will never be as cold when it is consumed as it was when it was put into the container.

SUMMARY OF THE INVENTION

An object of the present invention is to overcome those shortcomings of the prior art.

It is another object of the present invention to provide a lid for such a container which will transfer heat from the liquid in the container.

It is a further object of the present invention to provide a method for transferring heat from the liquid in such a container.

In accordance with an aspect of the present invention, a lid for an insulating container including a sealing cup having an opening for the passage of liquid comprises sealing means for preventing the passage of liquid from the container when the lid is secured to the container, attachment means for removably securing the lid to the container and a cooling member for extending through the opening sufficiently far when the lid is secured to the container to immerse the cooling member in the liquid in the sealing cup.

In a method aspect of the present invention, the liquid in a sealing insulating container is cooled by reducing the temperature of a cooling member and immersing the cooling member in the liquid in the container to cause heat transfer from the liquid to the cooling member.

The objects, features and advantages of the present invention will be apparent from the following detailed description of a preferred embodiment thereof.

DETAILED DESCRIPTION OF A PREFERRED EMBODIMENT

Figure 1:
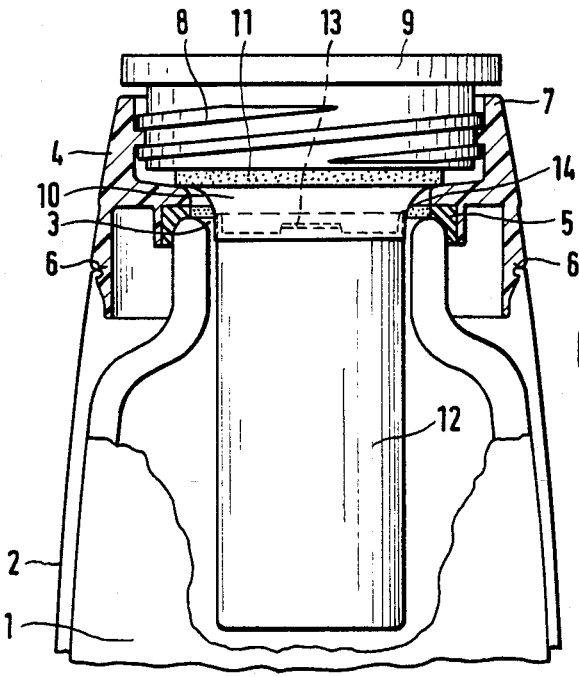
FIG. 1 is a cross-sectional view of an insulating container having a lid incorporating the present invention.

FIG. 1 shows an insulating container that consists of a heat-insulating sealing cup 1 surrounded by a cover 2. The sealing cup 1 has a top opening 3, against the upper rim of which a cap member 4 is sealed by a packing 5. The cap member 4 is fixed to the cover 2 by suitable means such as the tongue-and-groove connection 6. The cap 4 includes an upper cylindrical rim 7 with an inner thread. The cylindrical rim 7 can be provided on one side with a spout (not shown) and on the side of the cap 4 opposite the spout, a handle (also not shown) may also be provided. A screw lid 9, typically a molded or blown part made from synthetic material, includes a depending section 10 which projects into the top opening 3 of the sealing cup 1 when the lid 9 is screwed into the inner thread on the rim 7 by the mating coarse outer thread 8 on the lid 9. An elastic seal 11 on the screw lid is seated on a seal area of the cap 4 when the screw lid 9 is screwed firmly in place.

A hollow cylindrical cooling member 12 is threaded onto the depending section 10. The cooling member is a thin-walled cylindrical plastic body the top surface of which is provided with an access hole 13. In the embodiment shown in FIG. 1 the cooling member 12 screws by threads 14 to the depending section 10 of the screw lid 9. The shape of the cooling member is such that it fills the opening 3 of the sealing cup 1 to the largest extent possible yet does not contact the inner wall of the opening 3 of the sealing cup.

Figure 2:
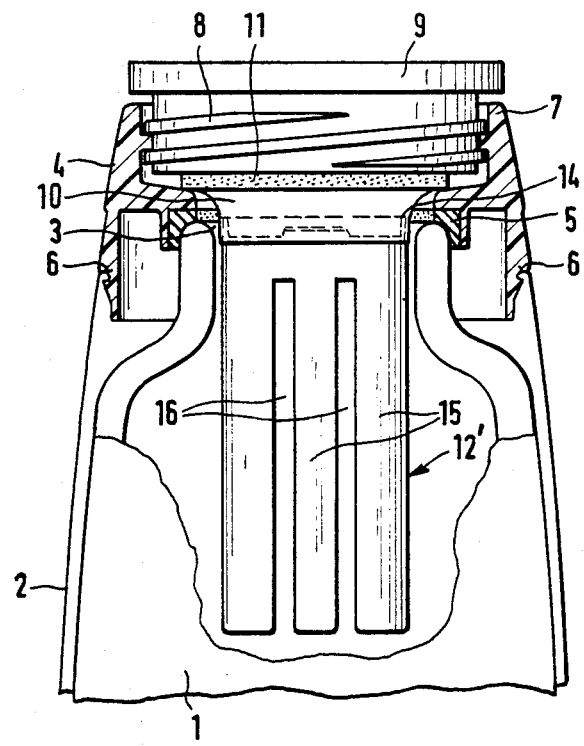
FIG. 2 is a cross-sectional view of an insulating container having a lid incorporating an alternate embodiment of the present invention.

The insulating container shown in FIG. 2 is substantially similar to that shown in FIG. 1, with the exception of the configuration of the cooling member. Like numerals are used for like parts in FIGS. 1 and 2.

The cooling member 12' of the lid shown in FIG. 2 comprises a plurality of elongated fingers which extend downwardly into the sealing cup 1. The fingers form spaces 16 between them. The cooling member 12' thus presents a larger surface area to the liquid in the container and improves the heat transfer to the cooling member from the liquid.

In practice, the cooling member is filled with a coolant, attached to the lid and placed in the freezer compartment of a refrigerator. When the temperature of the cooling member has been sufficiently lowered, the lid is screwed onto the top of the container. The cooling member extends far enough into the container to be immersed in the liquid in the sealing cup. By avoiding contact of the cooling member and the sealing cup, heat transfer to the cooling member from the surrounding atmosphere (instead from the liquid in the container) is minimized.

By making the cooling member of a molded or blown synthetic material, its walls can be made very thin to promote heat transfer to the coolant inside the cooling member from the liquid in the container.

It is possible to make the lid and cooling member as an integral unit, rather than making them detachable. In that case, the access opening 13 for the coolant can be at the bottom of the cooling member. However, by making the cooling member detachable from the lid it is possible to have one cooling member being refrigerated while another is in use. Then, if it is desired to quickly change the liquids in the container, the already refrigerated cooling member can be substituted for the one which has been warmed by use.

Any suitable material can be used as a coolant. Water is a typical example. However, other suitable materials are commercially available but are not convenient for use by general consumers. If such a material is to be used, it can be sealed into the cooling member. Sealed cooling members can also be detachably secured to the lid by threads 14 or other suitable means. In addition, the same cooling members can be used with different containers simply by standardizing the cross-sectional form and size of the sealing cup openings and the cooling members.

The present invention has been described by referring to a single embodiment. However, those skilled in the art will recognize modifications other than those pointed out above which can be made without departing from the spirit of the present invention. Thus, the scope of the invention is not limited by this detailed description of preferred embodiments, but rather is defined solely by the claims which follow.

What is claimed is:

1. An insulating container comprising:
    a sealing cup for holding liquids, said cup including an opening for the passage of liquid therethrough;
    a cover supporting said sealing cup;
    a lid for attachment to said cover;
    sealing means for preventing the passage of liquid from the container when the lid is secured to said cover;
    attachment means for removably securing said lid to said cover; and
    a cooling member removably attached to said lid for extending through said opening sufficiently far when said lid is secured to said container to immerse said cooling member in a liquid in said sealing cup, said cooling member having an external circumference substantially equal to but not contacting an inner surface of said opening; and
    said lid including joining means having a downwardly extending flange at an end thereof for threadedly engaging a corresponding upwardly extending flange on said cooling member, thereby detachably joining said cooling member to said lid.

2. An insulating container as in claim 1; wherein:
    said cover includes a cap member having a threaded section formed therein and packing means forming a head-insulating seal between said sealing cup and said cap member;
    said joining means including a threaded section for cooperating with said threaded section on said cap member and a shoulder located for facing a seal area on said cap member when the lid is secured to the container to form said sealing means;
    said sealing means further includes a plastic sealing ring for compressing between said seal area and said shoulder when said lid is secured to said cap; and
    said cooling member includes an elongated hollow cylindrical body secured to said lid by said joining means.

3. An insulating container as in claim 1; wherein said cooling member comprises a hollow body for holding a coolant, said hollow body having a plurality of elongated fingers for extending into the liquid in the sealing cup when the lid is secured to the container.

* * * * *